(12) United States Patent
Foster et al.

(10) Patent No.: US 11,385,640 B2
(45) Date of Patent: Jul. 12, 2022

(54) DYNAMIC IN-CABIN AUTONOMOUS VEHICLE CONTROL SYSTEMS

(71) Applicants: CNH Industrial America LLC, New Holland, PA (US); Autonomous Solutions, Inc., Mendon, UT (US)

(72) Inventors: Christopher A. Foster, Mohnton, PA (US); John H. Posselius, Ephrata, PA (US); Bret T. Turpin, Wellsville, UT (US); Daniel J. Morwood, Petersboro, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 355 days.

(21) Appl. No.: 16/455,140

(22) Filed: Jun. 27, 2019

(65) Prior Publication Data
US 2019/0317501 A1    Oct. 17, 2019

Related U.S. Application Data

(62) Division of application No. 15/166,734, filed on May 27, 2016, now Pat. No. 10,372,126.

(51) Int. Cl.
*G05D 1/00* (2006.01)
*G05D 1/02* (2020.01)
(Continued)

(52) U.S. Cl.
CPC .......... *G05D 1/0088* (2013.01); *A01B 69/00* (2013.01); *G05D 1/0212* (2013.01);
(Continued)

(58) Field of Classification Search
CPC .. G05D 1/0088; G05D 1/0212; G05D 1/0295; G05D 2201/0201; A01B 69/00; B62D 49/06
See application file for complete search history.

(56) References Cited

U.S. PATENT DOCUMENTS

| 5,448,479 A | 9/1995 | Kemner et al. |
| 5,469,356 A | 11/1995 | Hawkins et al. |

(Continued)

OTHER PUBLICATIONS

PCT Invitation to Pay Additional Fees for PCT Application No. PCT/US2017/034039 Mailed Jul. 14, 2017; 13 Pages.
(Continued)

*Primary Examiner* — James M McPherson
(74) *Attorney, Agent, or Firm* — Rebecca L. Henkel; Rickard K. DeMille

(57) ABSTRACT

One embodiment describes a control system in an automation system including a first portion located at a first vehicle, which includes a first autonomous module that autonomously controls operation of the first vehicle to perform operations in a first area based at least in part on a first target operation result while the first portion is in an autonomous mode; and a second portion located at a second vehicle, in which the second portion includes a second autonomous module that autonomously controls operation of the second vehicle to perform operations in a second area based at least in part on a second target operation result while the second portion is in the autonomous mode and a first command module that determines the first target operation result and the second target operation result based at least in part on a global plan that indicates a total target operation result.

15 Claims, 4 Drawing Sheets

(51) Int. Cl.
*A01B 69/00* (2006.01)
*B62D 49/06* (2006.01)

(52) U.S. Cl.
CPC ........... *G05D 1/0295* (2013.01); *B62D 49/06* (2013.01); *G05D 2201/0201* (2013.01)

(56) References Cited

U.S. PATENT DOCUMENTS

| | | |
|---|---|---|
| 6,259,980 B1 | 7/2001 | Peck et al. |
| 7,628,239 B1 | 12/2009 | Louie et al. |
| 7,894,951 B2 * | 2/2011 | Norris ................. G05D 1/0088 701/36 |
| 8,255,092 B2 | 8/2012 | Phillips |
| 2005/0004723 A1 | 1/2005 | Duggan et al. |
| 2007/0083318 A1 | 4/2007 | Parikh |
| 2009/0079839 A1 * | 3/2009 | Fischer .................. G01S 17/86 348/218.1 |
| 2013/0030606 A1 | 1/2013 | Mudalige et al. |
| 2013/0325242 A1 | 12/2013 | Cavender-Bares et al. |
| 2015/0025708 A1 * | 1/2015 | Anderson .......... A61B 5/02055 701/2 |
| 2015/0101519 A1 | 4/2015 | Blackwell et al. |
| 2015/0120089 A1 | 4/2015 | Peel et al. |
| 2015/0177736 A1 | 6/2015 | Anderson |
| 2015/0301532 A1 | 10/2015 | Norris et al. |
| 2015/0348419 A1 | 12/2015 | Matthews |
| 2016/0209842 A1 | 7/2016 | Thakur et al. |
| 2017/0080900 A1 | 3/2017 | Huennekens et al. |
| 2017/0192431 A1 | 7/2017 | Foster et al. |
| 2017/0261986 A1 | 9/2017 | Gerrish |
| 2018/0299894 A1 * | 10/2018 | Takase ................. A01D 41/127 |

OTHER PUBLICATIONS

PCT International Search Report & Written Opinion for PCT Application No. PCT/US2017/034039 dated Sep. 5, 2017; 19 Pages.

* cited by examiner

DYNAMIC IN-CABIN AUTONOMOUS VEHICLE CONTROL SYSTEMS

CROSS REFERENCE TO RELATED APPLICATION

Under 35 U.S.C. § 120, this application is a divisional of U.S. patent application Ser. No. 15/166,734, entitled "DYNAMIC IN-CABIN AUTONOMOUS VEHICLE CONTROL SYSTEMS," filed May 27, 2016, which is incorporated by reference herein in its entirety for all purposes.

BACKGROUND

The present disclosure relates generally to autonomous vehicles, and more particularly, to controlling and/or monitoring operation of autonomous vehicles.

In normal operation, an autonomous vehicle may autonomously control its operation, for example, based on high level instructions. In other words, an autonomous vehicle may be capable of operating with limited or even no human direction beyond the high level instructs. As such, an autonomous vehicle may be utilized in a wide array of operations, particularly when operation is relatively predictable. For example, in an agricultural context, an autonomous tractor may utilize high level instructions to relatively independently plant a field with seeds.

Although operation may be predictable, disturbance conditions may still occur and affect operation of an autonomous vehicle. For example, in the agricultural context, an agricultural implement towed by the autonomous tractor may become plugged (e.g., with seeds and/or dirt). In some instances, the autonomous vehicle may autonomously mitigate a disturbance condition and resume normal operation. However, in other instances, the autonomous vehicle may be unable to properly mitigate the disturbance condition on its own. In such instances, external intervention may be used to facilitate mitigating the disturbance condition.

SUMMARY

Certain embodiments commensurate in scope with the present disclosure are summarized below. These embodiments are not intended to limit the scope of the claims, but rather these embodiments are intended only to provide a brief summary of possible forms of the system and/or methods disclosed herein. Indeed, the systems and/or methods may encompass a variety of forms that may be similar to or different from the embodiments set forth below.

A first embodiment describes a control system that facilitates controlling operation of an agricultural automation system. The control system includes a first portion located at a first autonomous agricultural vehicle, which includes a first autonomous module that autonomously controls operation of the first autonomous agricultural vehicle to perform first agricultural operations in a first area of a field based at least in part on a first target operation result while the first portion of the control system is in an autonomous mode; and a second portion located at a second autonomous agricultural vehicle, in which the second portion is communicatively coupled to the first portion via a network, includes a second autonomous module that autonomously controls operation of the second autonomous agricultural vehicle to perform second agricultural operations in a second area of the field based at least in part on a second target operation result while the second portion of the control system is in the autonomous mode, and includes a first command module that determines the first target operation result and the second target operation result based at least in part on a global plan that indicates a total target operation result of the agricultural automation system.

A second embodiment describes a tangible, non-transitory, computer-readable media that stores instructions executable by one or more processors in an automation system. The instructions include instructions to activate, using the one or more processors, a first command module located at a first autonomous vehicle in the automation system to enable an operator to centrally control, monitor, or both control and monitor operation of the automation system from the first autonomous vehicle; determine, using the one or more processors, location of the operator in the automation system; and, when location of the operator is at a second autonomous vehicle in the automation system, deactivate, using the one or more processors, the first command module and activate, using the one or more processors, a second command module located at the second autonomous vehicle to enable the operator to centrally control, monitor, or both control and monitor the operation of the automation system from the second autonomous vehicle.

A third embodiment describes a method of controlling and monitoring operation of an autonomous vehicle fleet including autonomously controlling, using a first autonomous module located at a first autonomous vehicle, operation of the first autonomous vehicle while the first autonomous vehicle is in an autonomous mode; autonomously controlling, using a second autonomous module located at a second autonomous vehicle, operation of the second autonomous vehicle while the second autonomous vehicle is in the autonomous mode; receiving, using a first command module located at the first autonomous vehicle, sensor data indicative of operation of the second autonomous vehicle from one or more sensors; performing, using the first command module, diagnostics by processing, analyzing, or both the sensor data; and instructing, using the first command module, a display of the first autonomous vehicle to present a visual representation of the sensor data, results of the diagnostics, or both to enable an operator located at the first autonomous vehicle to manually control, monitor, or both control and monitor operation of the second autonomous vehicle from the first autonomous vehicle based at least in part on the sensor data, the results of the diagnostics, or both.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
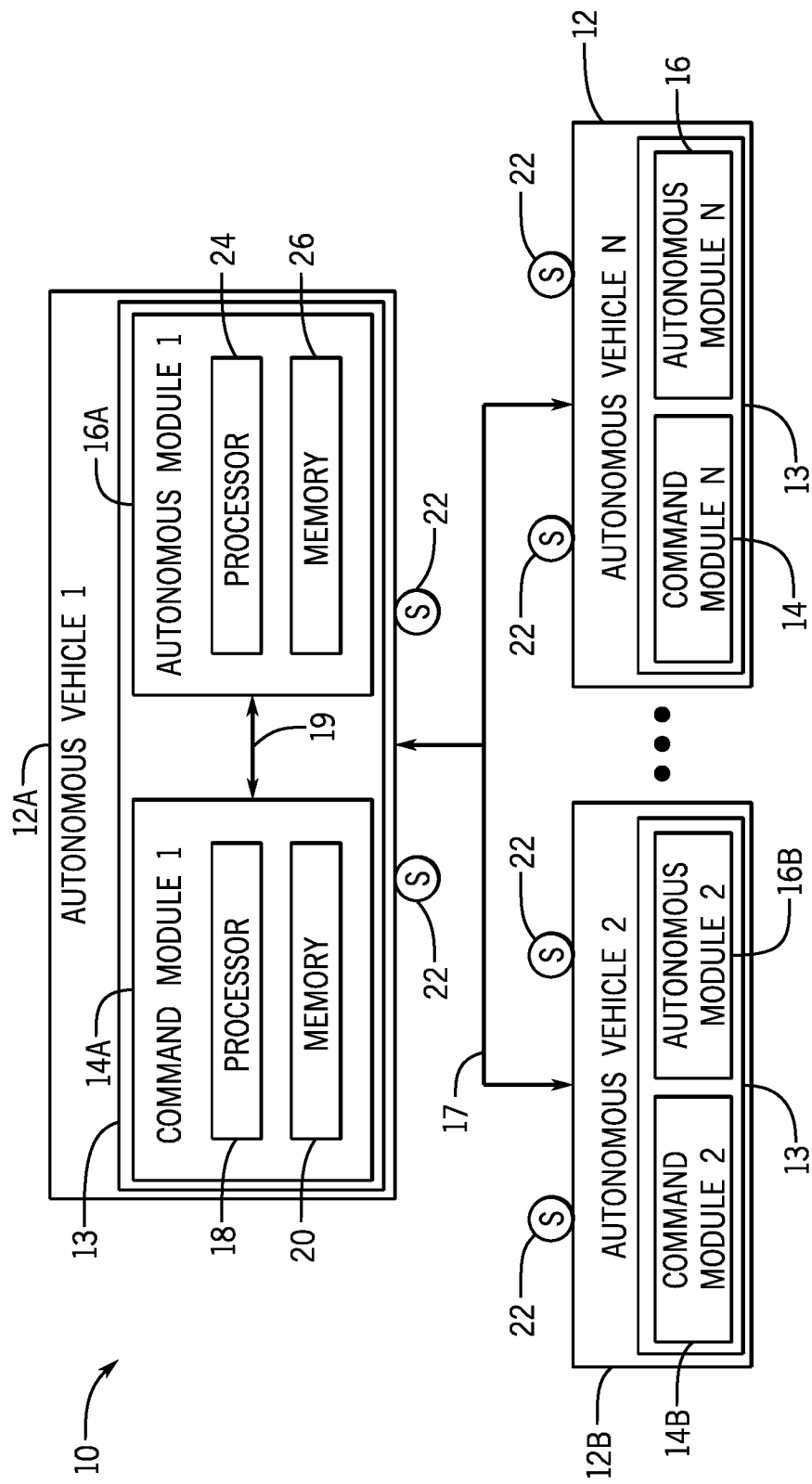
FIG. 1 is a block diagram of a control system for controlling operation of multiple autonomous vehicles, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As mentioned above, during normal operation (e.g., while operating in an autonomous mode), an autonomous vehicle may operate autonomously (e.g., relatively independently) with limited or no human intervention beyond high level instructions. Thus, utilizing autonomous vehicles may be beneficial in various operations—particularly when factors affecting operation of the autonomous vehicles are relatively predictable. For example, in an agricultural context, an agricultural vehicle (e.g., tractor or harvester) may tow or push a mounted, a semi-mounted, a trailing, or otherwise coupled agricultural attachment (e.g., an implement, header, a sprayer, or a fertilizer applicator) across a field to perform an agricultural operation, such as planting seeds in a field, harvesting crops for the field, applying wet or dry fertilizer in the field, or the like. In the agricultural context, the factors affecting operation of the agricultural vehicles may include size of the field, number of agricultural vehicles used to perform the agricultural operation, obstructions in the field, target locations to perform the agricultural operation, and/or certain disturbance conditions that may affect operation of the agricultural vehicles. Since many of such factors may be predetermined, the agricultural context is one example in which utilizing autonomous vehicles may be beneficial.

To facilitate clarity, the present disclosure is described primarily in relation to the agricultural context. However, it should be appreciated the techniques described in the present disclosure are not limited to the agricultural context. In fact, the techniques described in the present disclosure may be implemented in any suitable context involving coordinating, monitoring, and/or controlling operation of multiple vehicles, such as a package delivery context utilizing multiple autonomous delivery vehicles, a consumer context utilizing multiple autonomous consumer vehicles, a public transportation context utilizing multiple autonomous transportation vehicles, and/or a military deployment context utilizing multiple autonomous military vehicles.

In some embodiments, a control system may control and/or monitor operation of an autonomous vehicle. To facilitate the control and/or monitoring, the control system may include one or more command modules and one or more autonomous modules. In some embodiments, a command module may determine and communicate high level instructions that indicate target (e.g., desired) results expected to be achieved by operation of an autonomous vehicle to an autonomous module located in the autonomous vehicle. For example, in the agricultural context, the target operation results for an autonomous agricultural vehicle may include a target area assigned to the autonomous agricultural vehicle for planting operations, types of seeds to plant in different portions of the assigned area, target locations in the assigned area for planting seeds, and/or target seed spacing/density at the target locations.

Based on the high level instructions, the autonomous module may determine operational parameters, which when implemented may achieve the target operation results. For example, in the agricultural context, the operational parameters may include a path of the autonomous agricultural vehicle, speed of the autonomous agricultural vehicle along the path, and/or adjustments to operation of an agricultural attachment (e.g., an implement, header, a sprayer, or a fertilizer applicator) towed by the autonomous agricultural vehicle (e.g., autonomous harvester or autonomous tractor). The autonomous module may also determine low level instructions that instruct the autonomous vehicle to implement the determined operational parameters. For example, in the agricultural context, the low level instructions may include adjustments to the direction of the autonomous agricultural vehicle, fuel flow supplied to the engine of the autonomous agricultural vehicle, force applied to the brakes of the autonomous agricultural vehicle, and/or instructions instructing the agricultural attachment to adjust operation.

In some embodiments, the control system may be distributed between multiple autonomous vehicles in an autonomous vehicle fleet. For example, each of the autonomous vehicles may include an autonomous module. Additionally, a command module may communicate with the autonomous module of each autonomous vehicle to facilitate centrally coordinating operation of the autonomous vehicle fleet, for example, by determining and communicating corresponding target operation results to each of the autonomous modules.

Additionally, the command module may facilitate centrally monitoring operation of the autonomous vehicle fleet and/or individual autonomous vehicles, for example, to determine where a disturbance condition has occurred. To facilitate monitoring of an autonomous vehicle, the command module may receive sensor data from one or more sensors associated with the autonomous vehicle. In some embodiments, the command module may facilitate presentation of the sensor data to an operator, for example using a display, thereby enabling the operator to monitor operation of the autonomous vehicle.

Additionally or alternatively, the command module may process and/or analyze the sensor data to perform diagnostics. For example, in the agricultural context, a flow sensor may determine a flow rate of seeds output by an agricultural implement towed by an autonomous agricultural vehicle. Based on the flow rate data, the command module may determine that a plugged seed tube disturbance condition is affecting operation of the agricultural implement when the flow rate falls below a threshold value. In some embodiments, the command module may present the diagnostic results to the operator.

In some instances, the autonomous module of the autonomous vehicle may be able to autonomously resolve a disturbance condition. For example, in the agricultural context, the autonomous module may instruct the autonomous vehicle to jostle the agricultural implement when a plugged seed tube disturbance condition is detected. However, in other instances, the autonomous module may be unable to autonomously resolve the disturbance condition. In such instances, the command module may take over lower level control (e.g., determination of operational parameters and/or low level instructions) of the autonomous vehicle from the autonomous module. In some embodiments, the command module may switch the autonomous vehicle from an autonomous mode to a manual mode. In the manual mode, the command module may enable an operator to manually control operation of the autonomous vehicle via the command module, for example, to facilitate resolving the disturbance condition.

Thus, in some instances, the command module may be located remotely from each of the autonomous vehicles. For example, in the agricultural context, the command module may be located at a base station, such as a barn, remote from the field being planted by the autonomous agricultural vehicles. When located remotely, information available to a command module may be limited to available sensor data. For example, when a disturbance condition is not identified by analyzing the sensor data, a remote command module may be unable to determine that the disturbance condition has occurred.

Accordingly, to improve control and/or monitoring by a remote command module, the amount of sensor data gathered may be increased. In some instances, increasing the amount of sensor data may include increasing the number of sensors used with each autonomous vehicle. Additionally or alternatively, increasing the amount of sensor data may include using more comprehensive sensors, for example, using a 3D imager, which captures a 3D representation of surroundings, and/or an X-ray imager, which captures a sub-surface representation of surroundings, instead of a 2D imager (e.g., video camera), which merely captures a 2D representation of surroundings. However, increasing the number of sensors and/or utilizing more comprehensive sensors may increase the cost of implementing autonomous vehicles—particularly as the number of autonomous vehicles increases.

Accordingly, the present disclosure provides techniques to facilitate improving control and/or monitoring of autonomous vehicles by utilizing a command module located directly in one of the autonomous vehicles. In other words, the command module is not remote from each of the autonomous vehicles. For example, when an operator is in a first autonomous vehicle, a first command module located in the first autonomous vehicle may be activated. When activated, the first command module may facilitate providing the operator sensor data and/or diagnostics results associated with operation of the first autonomous vehicle as well as a second autonomous vehicle. In this manner, the first command module may facilitate monitoring operation of both the first autonomous vehicle and the second autonomous vehicle from the first autonomous vehicle.

Additionally, the first command module may facilitate controlling operation of the first autonomous vehicle and/or the second autonomous vehicle from the first autonomous vehicle. For example, when the first autonomous vehicle is in a manual mode, the first command module may receive user inputs from input devices (e.g., steering wheel, gas pedal, brake pedal, levers, etc.) of the first autonomous vehicle. In this manner, an operator via the first command module may manually control operation of the first autonomous vehicle using the input devices of the first autonomous vehicle. On the other hand, when the first autonomous vehicle is in an autonomous mode, the first command module may disengage user inputs from the input devices of the first autonomous vehicle.

Additionally, when the second autonomous vehicle is switched to a manual mode, the first command module may enable the operator to manually control operation of the second autonomous vehicle using the input devices of the first autonomous vehicle. In some embodiments, the first command module may receive user inputs from the operator via the input devices of the first autonomous vehicle. The first command module may then relay the user inputs to the second autonomous vehicle and instruct the second autonomous vehicle to adjust operation accordingly. Additionally, since the input devices are used to manually control operation of the first autonomous vehicle, operator familiarity with the inputs devices may be improved, thereby facilitating improved manual control of the second autonomous vehicle.

Furthermore, because the command module is located in one of the autonomous vehicles, the command module may be in closer proximity to the autonomous vehicles. As such, the ability of the operator to supplement the sensor data, for example, with information gathered by the operator's senses may be improved. For example, when the operator is within the first autonomous vehicle, the operator may gather additional information related to operation of the first autonomous vehicle to supplement the sensor data associated with the first autonomous vehicle. The operator may also gather information related to operation of the second autonomous vehicle to supplement the sensor data associated with the second autonomous vehicle. For example, from the cabin of the first autonomous vehicle, the operator may visually perceive operation of the second autonomous vehicle, and monitor operation of the second autonomous vehicle based on sensor data associated with the second autonomous vehicle as well as the visual perception of the second autonomous vehicle. Additionally, since located in closer proximity, the operator may quickly travel from the first autonomous vehicle to the second autonomous vehicle, which may enable the operator the gather additional information used to further supplement the sensor data. In this manner, monitoring operation of an autonomous vehicle fleet may be improved, the number of sensors may be reduced, the cost of sensors may be reduced, or any combination thereof.

As described above, the control system may be distributed. In some embodiments, to facilitate efficiency of operator movement, location of an activated command module may be dynamically adjusted. For example, when the operator moves to the second autonomous vehicle, the first command module may deactivate, and a second command module in the second autonomous vehicle may be activated. In other words, instead of having to travel back to the first autonomous vehicle, the operator may resume controlling and/or monitoring operation of the autonomous vehicle fleet from the second autonomous vehicle, thereby reducing operator travel time.

To help illustrate, FIG. 1 is a block diagram of an embodiment of an automation system 10, including a fleet of (e.g., multiple) autonomous vehicles 12. As described above, autonomous vehicles 12 may be utilized in various contexts. Accordingly, the automation system 10 may include one or more autonomous transportation vehicles 12, one or more autonomous delivery vehicles 12, one or more autonomous military vehicles 12, one or more autonomous agricultural vehicles 12, or any combination thereof. Although the depicted automation system 10 includes three autonomous vehicles 12, it should be understood that in other embodiments, an automation system 10 may include any number of autonomous vehicles 12. For example, some automation systems 10 may include a single autonomous vehicle 12, while others include two or more autonomous vehicles 12.

To facilitate controlling and/or monitoring operation, the automation system 10 also includes a control system 13. As described above, the control system 13 may be distributed and may include one or more command modules (e.g., controllers) 14 and one or more autonomous modules (e.g., controller) 16. For example, in the depicted embodiment, a first autonomous vehicle 12A includes a first portion of the control system 13—namely a first command module 14A and a first autonomous module 16A. Additionally, a second autonomous vehicle 12B includes a second portion of the control system 13—namely a second command module 14B and a second autonomous module 16B. In some embodiments, a command module 14 may additionally be located in a remote base station, for example, in a hybrid implementation (e.g., deployment).

To facilitate implementing a distributed control system 13, the various command modules 14 and autonomous modules 16 may be communicatively coupled to one another via a network. In some embodiments, a portion of the network between autonomous vehicles 12 may be a wireless network 17. For example, the wireless network 17 may include a mesh network, a personal area network (PAN), such as a Bluetooth network, a local area network (LAN), such as an 802.11x Wi-Fi network, a wide area network (WAN), such as a 4G or LTE cellular network, or any combination thereof, among other networks. Additionally, in some embodiments, a portion of the network within each autonomous vehicle 12 may include one or more internal busses 19, such as an ISOBUS, a CANbus, or the like. For example, in the depicted embodiment, the first command module 14A and the first autonomous module 16A may be communicatively coupled via an internal bus 19.

It should be noted that the various depicted components may be combined into fewer components or separated into additional components. For example, the command module 14 and the autonomous module 16 in certain autonomous vehicles 12 may be elements of a single component. Additionally, it should be noted that the various modules may include hardware elements (e.g., circuitry), software elements (e.g., a tangible, non-transitory computer-readable media storing instructions), or a combination of both hardware and software elements.

As described above, an activated command module 14 may provide a central access point for controlling and/or monitoring operation of the autonomous vehicles 12. To facilitate providing the central access point, the command module 14 may include a processor component 18 and a memory component 20. In some embodiments, the memory component 20 may include one or more tangible, non-transitory, computer-readable media that store instructions executable by and/or data to be processed by the processor component 18. For example, the memory component 20 may include random access memory (RAM), read only memory (ROM), rewritable non-volatile memory such as flash memory, hard drives, optical discs, and the like. Additionally, the processor component 18 may include one or more general purpose microprocessors, one or more application specific processors (ASICs), one or more field programmable logic arrays (FPGAs), or any combination thereof.

In the depicted embodiment, when activated, the first command module 14A may facilitate centrally controlling and/or monitoring operation of the automation system 10. For example, to coordinate operation of the autonomous vehicles 12, the first command module 14A may analyze a global plan to determine target operation results of the first autonomous vehicle 12A, the second autonomous vehicle 12B, and so on. The first command module 14A may then communicate high level instructions to the first autonomous module 16A, the second autonomous module 16B, and so on indicative of respective target operation results.

For example, in the agricultural context, the first command module 14A may communicate high level instructions to the first autonomous module 16A indicative of a target area assigned to the first autonomous vehicle 12A, autonomous operations (e.g., seed planting) to be performed by the first autonomous vehicle 12A in the assigned area, and/or parameters (e.g., types of seeds, target locations in its assigned area for planting seeds, and/or target seed spacing/density) with which to perform the autonomous operations, among other instructions. Additionally, the first command module 14A may communicate high level instructions to the second autonomous module 16B indicative of assignment of a target area assigned to the second autonomous vehicle 12B, autonomous operations (e.g., seed planting) to be performed by the second autonomous vehicle 12B in its assigned area, and/or parameters (e.g., types of seeds, target locations in the assigned area for planting seeds, and/or target seed spacing/density) with which to perform the autonomous operations, among other instructions. In a similar manner, the first command module 14A may communicate high level instructions to each of the other autonomous modules 16 indicative of target operation results of the corresponding autonomous vehicle 12, thereby coordinating operation the automation system 10.

To facilitate centrally monitoring operation of the automation system 10, the first command module 14A may receive sensor data from one or more sensors 22 disposed in the automation system 10. As described above, sensor data may be indicative of parameters associated with operation of a corresponding autonomous vehicle 12. For example, in some embodiments, the sensors 22 may include 2D imagers (e.g., video cameras), 3D imagers, X-ray imagers, flow rate sensors, speed sensors, temperature sensors, pressure sensors, global positioning sensors, or any combination thereof.

In some embodiments, the first command module 14A may facilitate presenting the received sensor data to an operator, for example, using a display in the cabin of the first autonomous vehicle 12A. Additionally or alternatively, the first command module 14A may perform diagnostics by processing and/or analyzing the sensor data, for example, to determine where a disturbance condition has occurred, where a disturbance condition is expected to occur in the future, an expected cause of a disturbance condition, and/or steps that may be taken to mitigate a disturbance condition. In some embodiments, the first command module 14A may facilitate presenting results of the diagnostics to the operator, for example, using a display, a visual indicator, and/or an audio indicator, or any combination thereof.

Additionally, as described above, an autonomous module 16 may autonomously (e.g., relatively independently) control operation of a respective autonomous vehicle 12 while the autonomous vehicle 12 is in an autonomous mode. To facilitate autonomously controlling operation, the autonomous module 16 may include a processor component 24 and a memory component 26. In some embodiments, the memory component 26 may include one or more tangible, non-transitory, computer-readable media that store instructions executable by and/or data to be processed by the processor component 24. For example, the memory component 26 may include random access memory (RAM), read only memory (ROM), rewritable non-volatile memory such as flash memory, hard drives, optical discs, and the like. Additionally, the processor component 24 may include one or more general purpose microprocessors, one or more application specific processors (ASICs), one or more field programmable logic arrays (FPGAs), or any combination thereof.

In the depicted embodiment, when the first autonomous vehicle 12A is in an autonomous mode, the first autonomous module 16A may autonomously control operation of the first autonomous vehicle 12A. As described above, the first autonomous module 16A may receive high level instructions indicating target operation results of the first autonomous vehicle 12A, for example, from an activated command module 14. Based on the high level instructions, the first autonomous modules 16A may determine operational parameters (e.g., speed, path, or the like) expected to achieve the target operation results when implemented. Additionally, the first autonomous module 16A may instruct the first autonomous vehicle to implement the determined operational parameters using low level instructions (e.g., direction, fuel supply, application of brakes, gear ratio, or the like).

For example, in the agricultural context, the first autonomous module 16A may determine a path of the first autonomous vehicle 12A, speed of the first autonomous vehicle 12 along the path, adjustments to operation of an agricultural attachment (e.g., an implement, header, a sprayer, or a fertilizer applicator) towed by the first autonomous vehicle 12A, or any combination thereof, for achieving the target operation results of the first autonomous vehicle 12A. To implement the operational parameters, the first autonomous module 16A may instruct the first autonomous vehicle 12A to adjust travel direction to follow the determined path, to adjust a throttle setting of the engine to achieve the determined speed, to adjust force applied to the brakes to achieve the determined speed, gear ratio of the transmission to achieve the determined speed, or any combination thereof. The first autonomous module 16A may also provide instructions instructing the agricultural attachment to adjust operation. In a similar manner, when in an autonomous mode, each of the other autonomous modules 16 may autonomously control operation of a corresponding autonomous vehicle 12.

Figure 2:
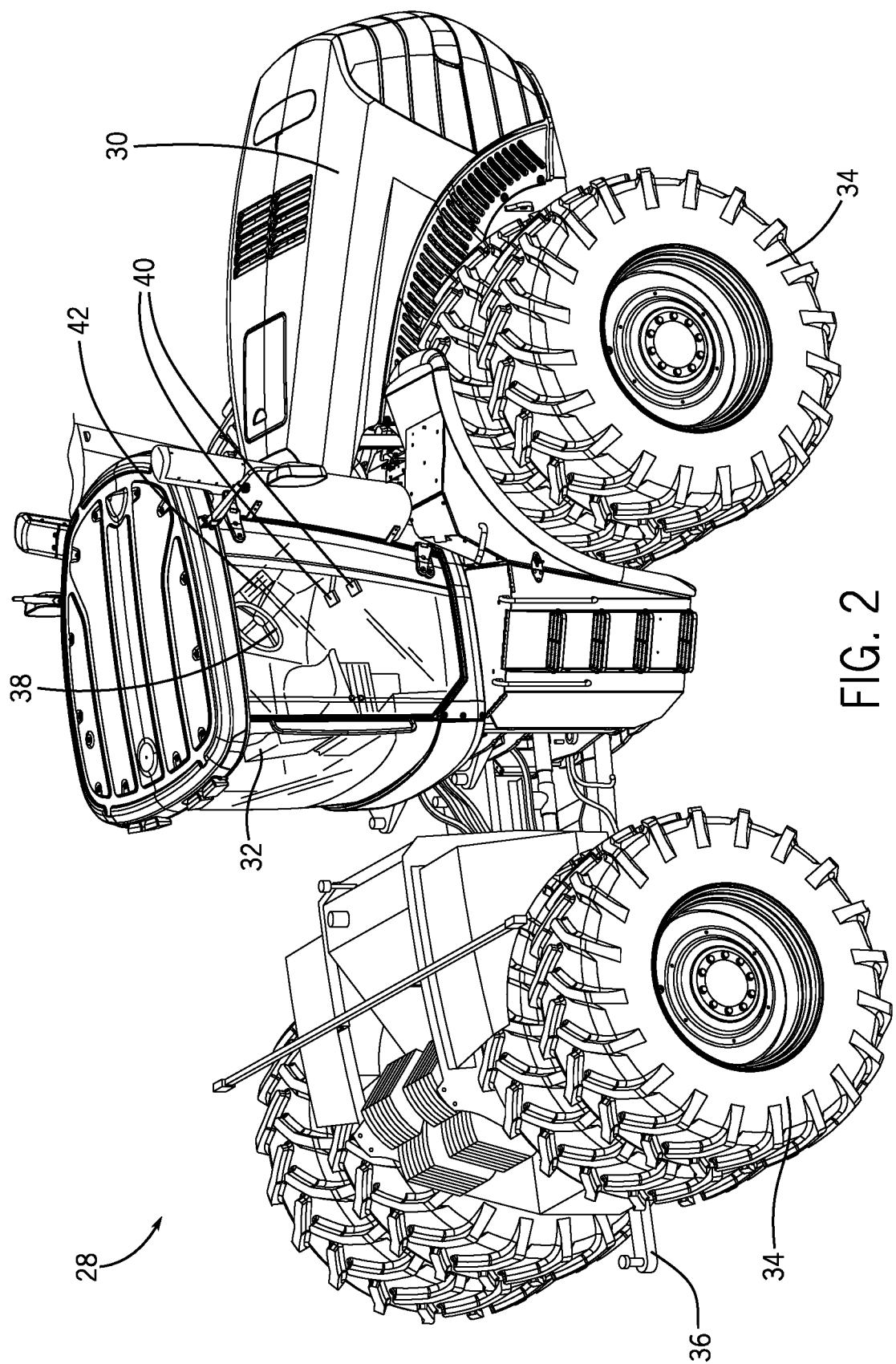
FIG. 2 is a perspective view of an autonomous agricultural vehicle, in accordance with an embodiment.

As described above, the automation system 10 may be used in various contexts, such as the agricultural context. Merely for illustrative purposes, one example of an autonomous agricultural vehicle 28 is shown in FIG. 2. In some embodiments, the autonomous agricultural vehicle 28 may be a tractor, an off-road vehicle, a work vehicle, or any other suitable vehicle that may include an autonomous module 16 and/or a command module 14.

In the depicted embodiment, the autonomous agricultural vehicle 28 includes a body 30, a cabin 32, wheels 34, and a hitch 36. In some embodiments, the body 30 may house an engine, a transmission system, a cooling system, a power train, an exhaust system, or any combination thereof. Additionally, the wheels 34 may rotate to move the autonomous agricultural vehicle 28. In the depicted embodiment, the autonomous agricultural vehicle 28 includes four front wheels 34 and four rear wheels 34. However, in other embodiments, the autonomous agricultural vehicle 28 may include any suitable number of front wheels 34 and/or any suitable number of rear wheels 34.

As described above, in some embodiments, the autonomous agricultural vehicle 28 may tow an agricultural attachment (e.g., an implement, header, a sprayer, or a fertilizer applicator) that performs an agricultural operation, such as planting seeds in a field, harvesting crops for the field, applying wet or dry fertilizer in the field, or the like. To facilitate towing, the autonomous agricultural vehicle 28 may be mechanically coupled to an agricultural attachment via the hitch 36. In this manner, movement of the autonomous agricultural vehicle 28 may drive movement of the agricultural attachment.

Additionally, the cabin 32 provides a location on the autonomous agricultural vehicle 28 for an operator to sit or stand. From the cabin 32, the operator may control and/or monitor operation of the autonomous agricultural vehicle 28, other autonomous vehicles 12, the automation system 10 as a whole, or any combination thereof. To facilitate manually controlling operation of the autonomous agricultural vehicle 28, the cabin 32 may include input devices. For example, in the depicted embodiment, the cabin 32 includes a steering wheel 38 and pedals 40. Although not depicted, the cabin 32 may include other input devices, such as control levers (e.g., a hydraulic valve control lever), dials (e.g., a three-point hitch position control dial), buttons (e.g., a four-wheel drive button or a diff-lock button), or any combination thereof.

Thus, when the autonomous agricultural vehicle 28 is switched to a manual mode, the operator may use the steering wheel 38 to control direction of the autonomous agricultural vehicle 28. Additionally, the operator may use the pedals 40 to control speed of the autonomous agricultural vehicle 28.

As described above, an activated command module 14 in the autonomous agricultural vehicle 28 may also enable the operator to manually control operation of another autonomous vehicle 12 from the cabin 32 of the autonomous agricultural vehicle 28 via the input devices. For example, when the other autonomous vehicle 12 is switched to a manual mode and user inputs via the steering wheel 38 are received by the command module 14 of the autonomous agricultural vehicle 28, the command module 14 may relay the user inputs to the other autonomous vehicle 12 via the wireless network 17, thereby instructing the other autonomous vehicle 12 to adjust direction of travel accordingly. Additionally, when user inputs via the pedals 40 are received by the command module 14, the command module 14 may relay the user inputs to the other autonomous vehicle 12 via the wireless network 17, thereby instructing the other autonomous vehicle 12 to adjust of travel accordingly. In some embodiments, the autonomous vehicle 12 may implement the user inputs using the portion of the control system 13 (e.g., a controller) in the autonomous vehicle 12.

To facilitate monitoring operation, the cabin 32 may include various output devices. For example, in the depicted embodiment, the cabin 32 includes one or more displays 42. The command module 14 may instruct a display 42 to display visual representations of information related to operation of the autonomous agricultural vehicle 28, other autonomous vehicles 12, the automation system 10 as a whole, or any combination thereof.

As described above, to facilitate monitoring operation of an autonomous vehicle 12, the command module 14 may instruct a display 42 to display a visual representation of sensor data received from sensors 22 associated with the autonomous vehicle 12. For example, the command module 14 may receive flow rate data from a flow rate sensor 22 on an agricultural implement towed by the autonomous agricultural vehicle 28 and instruct the display 42 to present a visual representation of the flow rate data. Additionally, the command module 14 may receive image data from a video sensor 22 and instruct the display 42 to present a visual representation of the image data.

Additionally, as described above, the command module 14 may perform diagnostics by processing and/or analyzing received sensor data to facilitate monitoring operations. For example, in the agricultural context, the command module 14 may compare a flow rate of seeds from an agricultural implement towed by the autonomous vehicle 12 to a threshold value. When the flow rate is below the threshold value, the command module 14 may determine that a plugged seed tube disturbance condition has occurred. Additionally, based on detection of the disturbance condition, the command module 14 may determine a cause of the disturbance condition and/or steps to mitigate the disturbance condition. In addition, the command module 14 may instruct the display 42 to display a visual representation of the diagnostic results. Based at least in part on the visual representation of the diagnostics results and/or the visual representation of the sensor data, the operator may monitor operation of one or more autonomous vehicles 12 from the cabin 32 of the autonomous agricultural vehicle 28.

In some embodiments, the cabin 32 may include multiple displays 42 to facilitate monitoring and/or controlling operation of multiple autonomous vehicles 12. For example, the cabin 32 in the autonomous agricultural vehicle 28 may include a first display 42 that presents diagnostics results and/or the visual representation of the sensor data related to operation of the autonomous agricultural vehicle 28 in addition to a second display 42 that presents diagnostics results and/or the visual representation of the sensor data related to operation of another autonomous vehicle 12. In this manner, the operator may utilize the information presented on the second display 42 to monitor and/or control operation of the other autonomous vehicle 12 from the cabin of the autonomous agricultural vehicle 28.

In other embodiments, the cabin 32 may include other output devices. For example, in some embodiments, the cabin 32 may additionally or alternatively include a speaker. In such embodiments, the speaker may provide an audible representation of information (e.g., sensor data and/or diagnostic results) related to operation of one or more autonomous vehicles 12 to the operator.

In this manner, the command module 14 may facilitate controlling and/or monitoring operation of one or more autonomous vehicles 12 from the autonomous agricultural vehicle 28. As described above, the command module 14 may also facilitate coordinating operation of multiple autonomous vehicles 12 based at least in part on a global plan.

Figure 3:
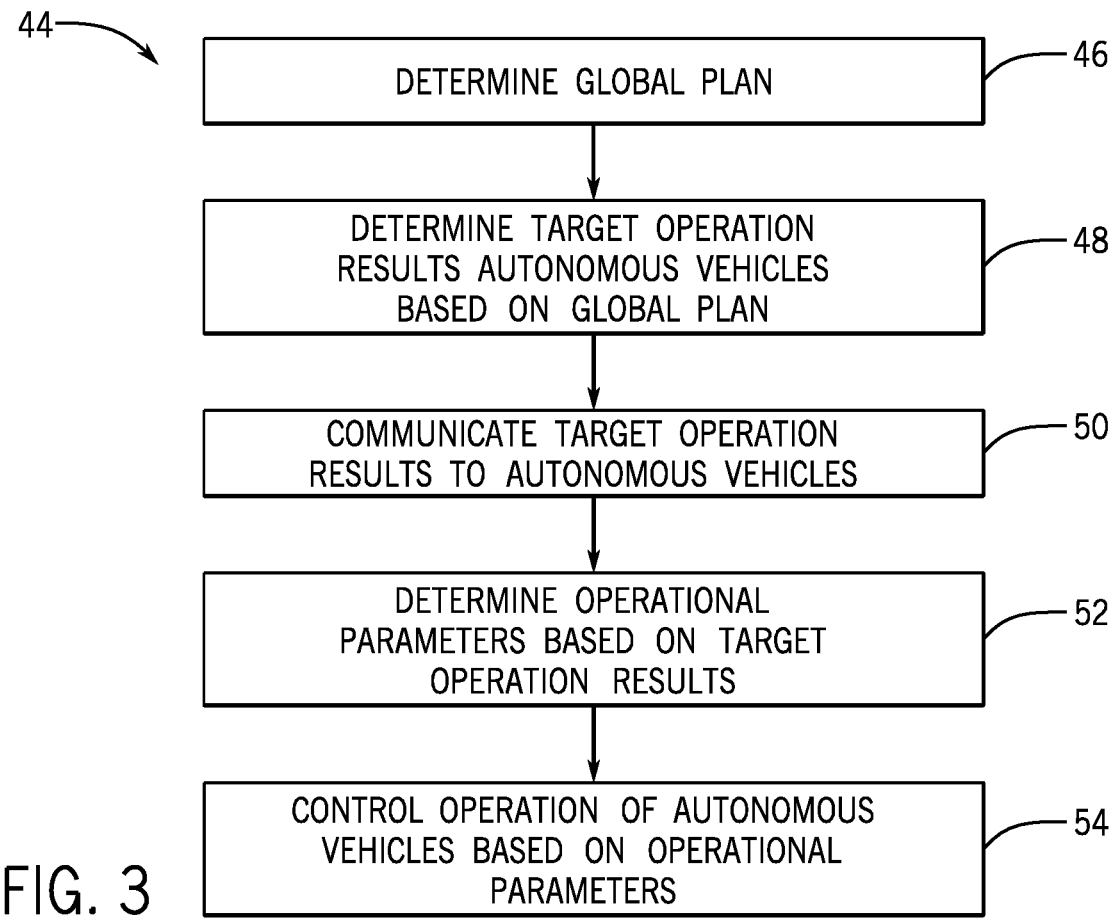
FIG. 3 is a flow diagram of a process for coordinating operation of multiple autonomous vehicles, in accordance with an embodiment.

To help illustrate, one embodiment of a process 44 for coordinating operation of an autonomous vehicle fleet is shown in FIG. 3. Generally, the process 44 includes determining a global plan (process block 46), determining target operation results for each autonomous vehicle based on the global plan (process block 48), communicating high level instructions for the target operation results to each autonomous vehicle (process block 50), determining operational parameters for the autonomous vehicles to achieve the target operation results (process block 52), and controlling operation of the autonomous vehicles based on low level instructions for implementing the operational parameters (process block 54). In some embodiments, the process 44 may be implemented by executing instructions stored in a tangible, non-transitory, computer-readable media, such as the memory component 20 and/or the memory component 26, using processing circuitry, such as the processor component 18 and/or the processor component 24.

In some embodiments, an activated command module 14 may determine a global plan (process block 46). In some embodiments, the global plan may include target operation results for combined operation of the autonomous vehicle fleet. To help illustrate, in an agricultural context, the global plan may include target operation results for total area in which agricultural operations are to be performed and, thus, may include the total area an agricultural operation to be performed in various portion of the total area, and/or parameters (e.g., target locations) with which to perform each agricultural operation. For example, in a seed planting context, the global plan may include total area to be planted by the autonomous vehicle fleet, types of seeds to be planted in each portion of the total area, target locations for planting seeds in the total area, seed spacing/density at each of the target locations, or any combination thereof.

Additionally, in some embodiments, the command module 14 receives the global plan, for example, from manual input by the operator, from the wireless network 17, from an I/O device (e.g., a flash drive) communicatively coupled to the command module 14, or any combination thereof. The command module 14 may then store the global plan in the memory component 20. Thus, the command module 14 may determine the global plan by retrieving the global plan from the memory component 20.

Based at least in part on the global plan, the activated command module 14 may determine target operation results for each of the autonomous vehicles 12 (process block 48). In some embodiments, the command module 14 may determine the target operation results for each autonomous vehicle 12 by dividing the global plan between the different autonomous vehicles 12. To help illustrate, in the agricultural context, the target operation results for an autonomous vehicle 12 may include target operation results for a portion (e.g., a target area) of the total area assigned to the autonomous vehicle 12 and, thus, may include the target area, agricultural operations to perform in the target area, and/or parameters with which to perform the agricultural operations in the target area. For example, in the seed planting context, the target operation results for the autonomous vehicle 12 may include the target area assigned to the autonomous vehicle 12 for planting, types of seeds to plant in each portion of the target area, target locations in the target area for planting seeds, target seed spacing/density at the target locations, or any combination thereof.

To facilitate determining the target operation results for each autonomous vehicle, the command module 14 may divide the global plan based on various factors, such as number of autonomous vehicles 12 utilized and/or capabilities of each of the autonomous vehicles 12. For example, in the agricultural context, the command module 14 may split the total area in which agricultural operations are to be performed equally among the autonomous vehicles 12. Additionally or alternatively, the command module 14 may divide the global plan based on type of seed to be planted by the agricultural implement towed by each autonomous vehicle 12.

The activated command module 14 may communicate high level instructions including assigned target operation results to each of the autonomous vehicle 12 (process block 50). As described above, in some embodiments, the command module 14 may communicate the high level instructions to an autonomous module 16 of other autonomous vehicle 12 via the wireless network 17. Additionally, in some embodiments, the command module 14 may communicate the high level instructions to an autonomous module 16 in the same autonomous vehicle 12 via an internal bus 19. In some embodiments, based on the high level instructions, an autonomous module 16 may determine and store the received target operation results in the memory component 26.

Based at least in part on the respective target operation results, each autonomous module 16 may determine operational parameters for implementation by the corresponding autonomous vehicle 12 (process block 52). When stored in the memory component 26, the autonomous module 16 may retrieve the target operation results from the memory component 26. As described above, an autonomous module 16 may determine operational parameters, which when implemented by the corresponding autonomous vehicle 12 are expected to achieve the target operation results. For example, in the agricultural context, an autonomous module 16 may determine a path for the autonomous vehicle 12, a speed of the autonomous vehicle 12 along the determined path, adjustments to operation of the agricultural attachment (e.g., an implement, header, a sprayer, or a fertilizer applicator) towed by the autonomous vehicle 12, or any combination thereof.

Additionally, when in an autonomous mode, each autonomous module 16 may instruct the corresponding autonomous vehicle 12 to implement the determined operational parameters using low level instructions (process block 54). In some embodiments, the low level instructions may be analogous to user inputs received when the autonomous vehicle 12 is in a manual mode. For example, to implement the determined path, the autonomous module 16 may determine low level instructions analogous to user inputs received via the steering wheel 38. Additionally, to implement the determined speed, the autonomous module 16 may determine low level instructions analogous to user inputs received via the pedals 40.

In this manner, the activated command module 14 may coordinate operation of the autonomous vehicle fleet. However, as described above, disturbance conditions may affect operation of an autonomous vehicle 12, and thus, the ability of the autonomous vehicle 12 to achieve its target operation results. As such, the control system 13 may continue monitoring operation of each autonomous vehicle 12.

Figure 4:
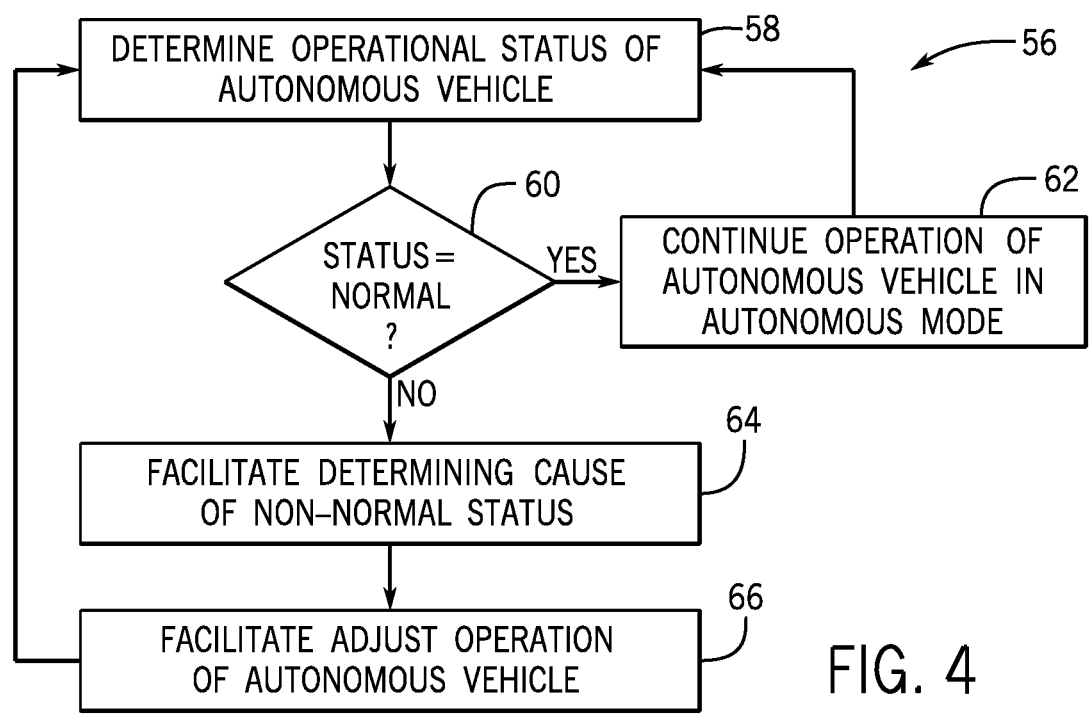
FIG. 4 is a flow diagram of a process for controlling operation of an autonomous vehicle, in accordance with an embodiment.

To help illustrate, one embodiment of a process 56 for monitoring operation of an autonomous vehicle 12 is shown in FIG. 4. Generally, the process 56 includes determining operational status of an autonomous vehicle (process block 58), determining whether the operational status is normal (decision block 60), and continuing operation of the autonomous vehicle in autonomous mode when the operational status is normal (process block 62). When the operational status is not normal, the process 56 includes facilitating determining a cause of the non-normal status (process block 64) and facilitating adjusting operation of the autonomous vehicle (process block 66). In some embodiments, the process 56 may be implemented by executing instructions stored in a tangible, non-transitory, computer-readable media, such as the memory component 20 and/or the memory component 26, using processing circuitry, such as the processor component 18 and/or the processor component 24.

In some embodiments, the control system 13 may determine operational status of an autonomous vehicle 12 (process block 58). In some embodiments, an activated command module 14 may facilitate determining operational status of each autonomous vehicle 12. For example, as described above, the command module 14 may instruct an output device to present the operator with a representation of sensor data received from sensors associated with each autonomous vehicle 12. Additionally, because the operator may be located in closer proximity to the autonomous vehicles 12, the operator may supplement the sensor data, for example, using the information determine via the operator's senses. In this manner, the operator may determine operational status of each autonomous vehicle 12 based on the sensor data and any additional information gathered by the operator.

Additionally or alternatively, in some embodiments, the command module 14 may autonomously determine operational status of each autonomous vehicle 12 based on the corresponding sensor data. For example, the command module 14 may perform diagnostics by analyzing and/or processing sensor data received from one or more sensors 22 associated with each autonomous vehicle 12. As described above, the diagnostic results may indicate where a disturbance condition has occurred, where a disturbance condition is expected to occur in the future, a cause of a disturbance condition, and/or steps that may be taken to mitigate a disturbance condition. Accordingly, based on the diagnostic results, the command module 14 may autonomously determine operational status of each autonomous vehicle 12.

In some embodiments, the operational status of the autonomous vehicle 12 may be normal when it is determined that operation of the autonomous vehicle 12 is not being affected by a disturbance condition. On the other hand, the operational status of the autonomous vehicle 12 may be non-normal when it is determined that operation of the autonomous vehicle 12 is being affected by a disturbance condition. It should be noted that in some embodiments, intermediate operational statuses between the normal status and the non-normal status may be determined. For example, an anticipated non-normal operational status may be determined when a disturbance condition is not currently affecting operation of the autonomous vehicle 12, but is expected to in the future.

The control system 13 may determine whether the operational status of the autonomous vehicle 12 is normal (decision block 60). When the operational status is normal, the control system 13 may instruct the autonomous vehicle 12 and, more specifically, the autonomous module 16 to continue operating in an autonomous mode (process block 62). As described above, in an autonomous mode, the autonomous module 16 may instruct the autonomous vehicle 12 to implement operational parameters that are expected to achieve the assigned target operation results.

On the other hand, when the operational status of the autonomous vehicle 12 is not normal (e.g., non-normal), the control system 13 may facilitate determining cause of the non-normal operational status (process block 64). As described above, sensor data associated with an autonomous vehicle 12 may provide an indication of a disturbance condition and/or a cause of a disturbance condition. Thus, in some embodiments, the command module 14 may facilitate determining a cause of the non-normal operational status by instructing an output device (e.g., display 42) to present representations of the sensor data. In this manner, the operator may use the sensor data and any additional information gathered by the operator to determine a cause of the non-normal operational status.

Additionally or alternatively, the command module 14 and/or the autonomous module 16 may perform diagnostics to determine a cause of the non-normal status by analyzing and/or processing the sensor data. In such embodiments, the command module 14 may instruct the output device (e.g., display 42) to present a representation of the determined cause of the non-normal operational status to the operator.

When the non-normal operational status is detected, the control system 13 may also facilitate adjusting operation of the autonomous vehicle 12 (process block 66). In some embodiments, the command module 14 and/or the autonomous module 16 may autonomously attempt to mitigate a disturbance condition causing the non-normal operational status. For example, the command module 14 and/or the autonomous module 16 may instruct the autonomous vehicle 12 and, more specifically, a controller in the autonomous vehicle 12 to jostle the agricultural implement in attempt to mitigate a plugged seed tube disturbance condition by unclogging the seed tube. Additionally, the command module 14 may facilitate mitigating the non-normal operational status by enabling the operator to manually control operation of the autonomous vehicle 12.

Figure 5:
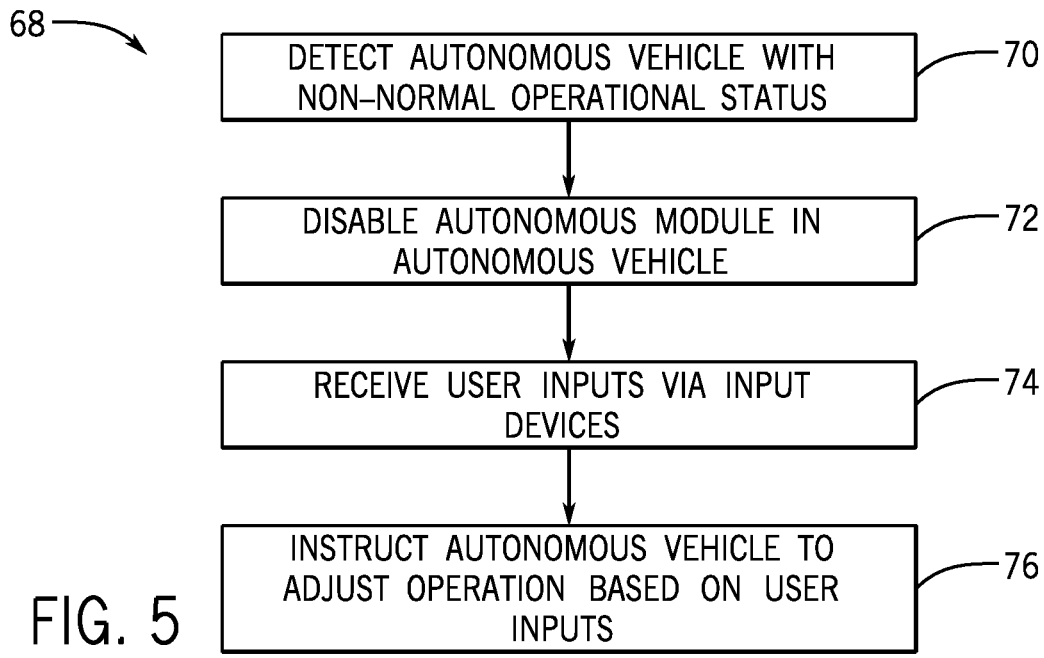
FIG. 5 is a flow diagram of a process for externally adjusting operation of the autonomous vehicle, in accordance with an embodiment.

To help illustrate, one embodiment of a process 68 for facilitate manual control of an autonomous vehicle 12 is shown in FIG. 5. Generally, the process 68 includes detecting an autonomous vehicle with a non-normal operational status (process block 70), disabling an autonomous module in the autonomous vehicle (process block 72), receiving user inputs via inputs devices (process block 74), and instructing the autonomous vehicle to adjust operation based on the user inputs (process block 76). In some embodiments, the process 68 may be implemented by executing instructions stored in a tangible, non-transitory, computer-readable media, such as the memory component 20 and/or the memory component 26, using processing circuitry, such as the processor component 18 and/or the processor component 24.

As described above, in some embodiments, the control system 13 may facilitate detecting a non-normal operational status of an autonomous vehicle 12 (process block 70). When the non-normal operational status is detected, the control system 13 may disable the autonomous module 16 in the autonomous vehicle 12 with the non-normal operational status (process block 72). In this manner, the autonomous vehicle 12 may be switched from an autonomous mode to a manual mode. As described above, in a manual mode, operation of the autonomous vehicle 12 may be manually controlled by an operator via an activated command module 14.

Accordingly, the activated command module 14 may receive user inputs via inputs devices (e.g., steering wheel 38 and/or pedals 40) (process block 74) and instruct the autonomous vehicle 12 and, more specifically, a controller in the autonomous vehicle 12 with the non-normal operational status to adjust operation based on the user inputs (process block 76). In some instances, the activated command module 14 may be located in the autonomous vehicle 12 with the non-normal operational status. In such instances, the command module 14 may engage the input devices in the autonomous vehicle 12. In this manner, the operator may use the input devices in the autonomous vehicle 12 to manually control operation of the autonomous vehicle 12.

In other instances, the activated command module 14 may be located in an autonomous vehicle 12 different from the autonomous vehicle 12 with the non-normal operational status. For example, the activated command module 14 may be located in the first autonomous vehicle 12A while the second autonomous vehicle 12B has the non-normal operational status. In such instances, the command module 14 may maintain the disengaged state of the input devices in the first autonomous vehicle 12A. Instead, the command module 14 may relay the user inputs to the second autonomous vehicle 12B and instruct the second autonomous vehicle 12B and, most specifically, a controller in the second autonomous vehicle 12B to adjust operation based on the user inputs. In this manner, the operator may use the input devices in the first autonomous vehicle 12A to manually control operation of the second autonomous vehicle 12B.

Locating the command module 14 in the first autonomous vehicle 12A enables utilizing input devices in the cabin 32 of the first autonomous vehicle 12A to manually control operation of the second autonomous vehicle 12B. As such, the input devices used to manually control operation of the second autonomous vehicle 12B may be the same or similar to ones traditionally used to operate the second autonomous vehicle 12B from the cabin 32 of the second autonomous vehicle 12B. As such, the operator may be familiar with the input devices, and the input devices may be better suited for controlling operation of the second autonomous vehicle 12B.

Comparatively, utilizing a command module remote from each of the autonomous vehicles 12 (e.g., at a remote base station) may limit the input devices that can be utilized to manually control operation of the autonomous vehicles 12. In some instances, due to implementation limitations and/or practicality, the input devices used at a remote command module may be substantially different from the input devices traditionally used. For example, the input devices available at a remote command module may be limited to a keyboard and/or touch gestures on a screen. However, compared to a keyboard and/or touch screen gestures, a steering wheel 38, pedals 40, control levers, dials, and/or buttons may be better suited for controlling operation of an autonomous vehicle 12.

In addition to manually controlling operation, the operator may physically go to the autonomous vehicle 12 with the non-normal operational status to mitigate a disturbance condition causing the non-normal operational status. Since the activated command module 14 may be located in closer proximity, ability of the operator to travel to the autonomous vehicle 12 with the non-normal operational status may be improved. However, since travel may still be non-negligible, which command module 14 is activated may be dynamically adjusted to reduce travel time of the operator.

Figure 6:
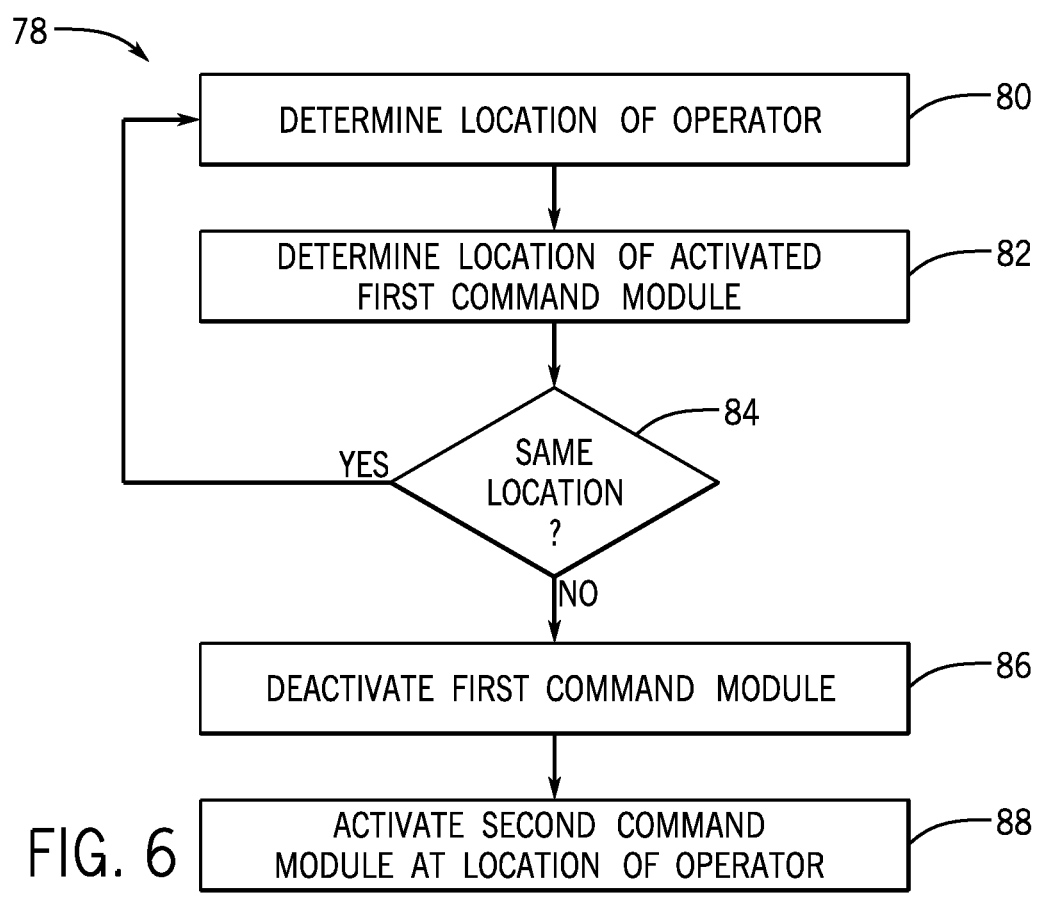
FIG. 6 is a flow diagram of a process for dynamically adjusting a configuration of the control system, in accordance with an embodiment.

To help illustrate, one embodiment of a process 78 for dynamically adjusting location of an activated command module 14 is shown in FIG. 6. Generally, the process 78 includes determining a location of an operator (process block 80), determining a location of an activated first command module (process block 82), and determining whether the location of the operator and the location of the activated first command module are the same (decision block 84). When the locations are different, the process 78 includes deactivating the first command module (process block 86) and activating a second command module at the location of the operator (process block 88). In some embodiments, the process 78 may be implemented by executing instructions stored in a tangible, non-transitory, computer-readable media, such as the memory component 20 and/or the memory component 26, using processing circuitry, such as the processor component 18 and/or the processor component 24.

In such embodiments, the control system 13 may determine the location of the operator (process block 80). In some embodiments, the location of the operator may be indicated as the autonomous vehicle 12 in closest proximity to the operator. Additionally, in some embodiments, the control system 13 may automatically determine the location of the operator using various sensors 22. For example, a pressure sensor may be disposed in the seat of an autonomous vehicle 12. When the pressure sensor detects a downward pressure on the seat, the control system 13 may determine that the operator is located in the cabin 32 of the corresponding autonomous vehicle 12. Additionally or alternatively, the operator may manually indicate the operator's location. For example, the operator may input to the control system 13 that the operator will be moving from the first autonomous vehicle 12A to a second autonomous vehicle 12B or select a push button upon reaching the second autonomous vehicle 12B. As such, the control system 13 may determine that the location of the operator is at the second autonomous vehicle 12B.

The control system 13 may also determine the location of an activated command module 14 (process block 82). In some embodiments, the location of the activated command module 14 may be the autonomous vehicle 12 in which the command module 14 is located. Additionally, in some embodiments, the location of each command module 14 may be predetermined and stored in its memory component 26. In such embodiments, the activated command module 14 may retrieve its location from its memory component 26.

Additionally, the control system 13 may determine whether the location of the activated command module 14 and the location of the operator is the same (decision block 84). In some embodiments, the control system 13 may determine whether the activated command module 14 and the operator are located in the same autonomous vehicle 12. For example, when activated, the first command module 14A may determine whether the operator is located in the first autonomous vehicle 12A.

When the location of the activated command module 14 and the location of operator are different, the control system 13 may deactivate the activated command module (process block 86) and activate another command module corresponding to the location of the operator (process block 88). In some embodiments, the control system 13 may activate the command module 14 in the autonomous vehicle 12 closest in proximity to the location of the operator. Additionally or alternatively, the control system 13 may activate the command module 14 in an autonomous vehicle 12 that the operator indicated to be moving to. In this manner, the activated command module 14 in the control system 13 may be dynamically adjusted such that the activated command module 14 is closer in proximity to the operator, thereby facilitating a reduction in operator travel time and, thus, efficiency with which the operator may control and/or monitor operation of the automation system 10.

Accordingly, the present disclosure provides techniques to facilitate improving controlling and/or monitoring operation of an autonomous vehicle fleet. In some embodiments, a control system used to control and/or monitor operation may be distributed between the various autonomous vehicles such that an activated command module is located within one of the autonomous vehicles. Distributing the control system in this manner may improve the ability of an operator to supplement sensor data used to control and/or monitor operation of the autonomous vehicle fleet, which may enable using few sensors, less comprehensive (e.g., less costly) sensors, improving control capabilities, improving monitoring capabilities, or any combination thereof. Additionally, in some embodiments, the location of an activated command module may be dynamically adjusted, for example, based on location of the operator. In some embodiments, this may facilitate reducing travel time of the operator and, thus, the efficiency of controlling and/or monitoring operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An autonomous vehicle system comprising:
    a first autonomous module to be deployed in a first autonomous vehicle of the autonomous vehicle system, wherein the first autonomous module is configured to autonomously control operation of the first autonomous vehicle based at least in part on first sensor data associated with operation of the first autonomous vehicle while the first autonomous vehicle is in an autonomous mode; and
    an activated command module to be deployed in one of a plurality of autonomous vehicles comprising the first autonomous vehicle and a second autonomous vehicle, wherein the activated command module is configured to, while the first autonomous vehicle is in the autonomous mode:
        instruct the first autonomous vehicle to disengage a first one or more input devices implemented in the first autonomous vehicle to enable the first autonomous module to autonomously control operation of the first autonomous vehicle; and
        when the activated command module is deployed in the first autonomous vehicle, instruct the first autonomous vehicle to relay a first one or more user inputs received via the first one or more input devices deployed in the first autonomous vehicle to the second autonomous vehicle in the autonomous vehicle system to enable an operator to manually control operation of the second autonomous vehicle using the first one or more input devices deployed in the first autonomous vehicle while the second autonomous vehicle is in a manual mode.

2. The autonomous vehicle system of claim 1, comprising a second autonomous module to be deployed in the second autonomous vehicle of the autonomous vehicle system, wherein:
    the second autonomous module is configured to autonomously control operation of the second autonomous vehicle based at least in part on second sensor data associated with operation of the second autonomous vehicle while the second autonomous vehicle is in the autonomous mode; and
    the activated command module is configured to:
        perform diagnostics on operation of the autonomous vehicle system based at least in part on the first sensor data associated with operation of the first autonomous vehicle and the second sensor data associated with operation of the second autonomous vehicle; and
        instruct an electronic display deployed in the one of the plurality of autonomous vehicles to display a first visual representation of the first sensor data, a second visual representation of the second sensor data, a third visual representation of a result of the diagnostics, or any combination thereof to enable the operator to control, monitor, or both control and monitor operation of the autonomous vehicle system from the one of the plurality of autonomous vehicles.

3. The autonomous vehicle system of claim 1, comprising a second autonomous module to be deployed in the second autonomous vehicle of the autonomous vehicle system, wherein, while the second autonomous vehicle is in the autonomous mode:
the second autonomous module is configured to autonomously control operation of the second autonomous vehicle based at least in part on second sensor data associated with operation of the second autonomous vehicle; and
the activated command module is configured to:
instruct the second autonomous vehicle to disengage a second one or more input devices implemented in the second autonomous vehicle to enable the second autonomous module to autonomously control operation of the second autonomous vehicle; and
when the activated command module is deployed in the second autonomous vehicle, instruct the second autonomous vehicle to relay a second one or more user inputs received via the second one or more input devices deployed in the second autonomous vehicle to the first autonomous vehicle in the autonomous vehicle system to enable the operator to manually control operation of the first autonomous vehicle using the second one or more input devices deployed in the second autonomous vehicle while the first autonomous vehicle is in the manual mode.

4. The autonomous vehicle system of claim 1, wherein, when the activated command module is deployed in the first autonomous vehicle, the activated command module is configured to instruct the first autonomous vehicle to engage the first one or more input devices deployed in the first autonomous vehicle to enable the operator to manually control operation of the first autonomous vehicle using the first one or more input devices deployed in the first autonomous vehicle while the first autonomous vehicle is in the manual mode.

5. The autonomous vehicle system of claim 1, wherein:
the first one or more input devices deployed in the first autonomous vehicle comprise a steering wheel; and
when the activated command module is deployed in the first autonomous vehicle while the first autonomous vehicle is in the autonomous mode, the activated command module is configured to instruct the first autonomous vehicle to relay a steering wheel user input received via the steering wheel deployed in the first autonomous vehicle to the second autonomous vehicle to enable the operator to manually control travel direction of the second autonomous vehicle using the steering wheel deployed in the first autonomous vehicle while the second autonomous vehicle is in the manual mode.

6. The autonomous vehicle system of claim 1, wherein:
the first one or more input devices deployed in the first autonomous vehicle comprise a gas pedal; and
when the activated command module is deployed in the first autonomous vehicle while the first autonomous vehicle is in the autonomous mode, the activated command module is configured to instruct the first autonomous vehicle to relay a gas pedal user input received via the gas pedal deployed in the first autonomous vehicle to the second autonomous vehicle to enable the operator to manually control acceleration of the second autonomous vehicle using the gas pedal deployed in the first autonomous vehicle while the second autonomous vehicle is in the manual mode.

7. The autonomous vehicle system of claim 1, wherein:
the first one or more input devices deployed in the first autonomous vehicle comprise a brake pedal; and
when the activated command module is deployed in the first autonomous vehicle while the first autonomous vehicle is in the autonomous mode, the activated command module is configured to instruct the first autonomous vehicle to relay a brake pedal user input received via the brake pedal deployed in the first autonomous vehicle to the second autonomous vehicle to enable the operator to manually control deceleration of the second autonomous vehicle using the brake pedal deployed in the first autonomous vehicle while the second autonomous vehicle is in the manual mode.

8. The autonomous vehicle system of claim 1, wherein:
the first autonomous vehicle comprises a first autonomous agricultural vehicle, a first autonomous delivery vehicle, a first autonomous consumer vehicle, a first autonomous public transportation vehicle, or a first autonomous military vehicle; and
the second autonomous vehicle comprises a second autonomous agricultural vehicle, a second autonomous delivery vehicle, a second autonomous consumer vehicle, a second autonomous public transportation vehicle, or a second autonomous military vehicle.

9. One or more tangible, non-transitory, computer-readable media comprising instructions configured to cause one or more processors of an autonomous vehicle system to:
determine first sensor data resulting from operation of a first autonomous vehicle in the autonomous vehicle system; and
while the first autonomous vehicle is in an autonomous mode:
instruct the first autonomous vehicle to disengage a first one or more input devices deployed in the first autonomous vehicle to enable a first autonomous module to autonomously control operation of the first autonomous vehicle based at least in part on the first sensor data; and
instruct the first autonomous vehicle to relay a first one or more user inputs received via the first one or more input devices deployed in the first autonomous vehicle to a second autonomous vehicle in the autonomous vehicle system to enable a user to manually control operation of the second autonomous vehicle using the first one or more input devices deployed in the first autonomous vehicle while the second autonomous vehicle is in a manual mode.

10. The one or more tangible, non-transitory, computer-readable media of claim 9, comprising instructions configured to cause the one or more processors to:
determine second sensor data resulting from operation of the second autonomous vehicle in the autonomous vehicle system;
perform diagnostics on operation of the second autonomous vehicle based at least in part on the second sensor data; and
instruct an electronic display deployed at the first autonomous vehicle to display a first visual representation of the second sensor data resulting from operation of the second autonomous vehicle, a second visual representation of a result of the diagnostics, or both to enable the user to control, monitor, or both control and monitor operation of the second autonomous vehicle from the first autonomous vehicle.

11. The one or more tangible, non-transitory, computer-readable media of claim 9, comprising instructions configured to cause the one or more processors to instruct the first autonomous vehicle to engage the first one or more input devices deployed in the first autonomous vehicle to enable the user to manually control operation of the first autonomous vehicle using the first one or more input devices deployed in the first autonomous vehicle while the first autonomous vehicle is in the manual mode.

12. The one or more tangible, non-transitory, computer-readable media of claim 9, comprising instructions configured to cause the one or more processors to:
   determine second sensor data resulting from operation of the second autonomous vehicle in the autonomous vehicle system; and
   while the second autonomous vehicle is in the autonomous mode:
      instruct the second autonomous vehicle to disengage a second one or more input devices deployed in the second autonomous vehicle to enable a second autonomous module to autonomously control operation of the second autonomous vehicle based at least in part on the second sensor data; and
      instruct the second autonomous vehicle to relay a second one or more user inputs received via the second one or more input devices deployed in the second autonomous vehicle to the first autonomous vehicle to enable the user to manually control operation of the first autonomous vehicle using the second one or more input devices deployed in the second autonomous vehicle while the first autonomous vehicle is in the manual mode.

13. The one or more tangible, non-transitory, computer-readable media of claim 9, wherein:
   the first one or more input devices deployed in the first autonomous vehicle comprise a steering wheel; and
   the instructions configured to cause the one or more processors to instruct the first autonomous vehicle to relay the first one or more user inputs to the second autonomous vehicle comprise instructions configured to cause the one or more processors to instruct the first autonomous vehicle to relay a steering wheel user input received via the steering wheel deployed in the first autonomous vehicle to the second autonomous vehicle to enable the user to manually control travel direction of the second autonomous vehicle using the steering wheel deployed in the first autonomous vehicle.

14. The one or more tangible, non-transitory, computer-readable media of claim 9, wherein:
   the first one or more input devices deployed in the first autonomous vehicle comprise a gas pedal; and
   the instructions configured to cause the one or more processors to instruct the first autonomous vehicle to relay the first one or more user inputs to the second autonomous vehicle comprise instructions configured to cause the one or more processors to instruct the first autonomous vehicle to relay a gas pedal user input received via the gas pedal deployed in the first autonomous vehicle to the second autonomous vehicle to enable the user to manually control travel speed of the second autonomous vehicle using the gas pedal deployed in the first autonomous vehicle.

15. The one or more tangible, non-transitory, computer-readable media of claim 9, wherein:
   the first one or more input devices deployed in the first autonomous vehicle comprise a brake pedal; and
   the instructions configured to cause the one or more processors to instruct the first autonomous vehicle to relay the first one or more user inputs to the second autonomous vehicle comprise instructions configured to cause the one or more processors to instruct the first autonomous vehicle to relay a brake pedal user input received via the brake pedal deployed in the first autonomous vehicle to the second autonomous vehicle to enable the user to manually control travel speed of the second autonomous vehicle using the brake pedal deployed in the first autonomous vehicle.

* * * * *